L. M. BARNES.
FRUIT PICKER.
APPLICATION FILED JULY 22, 1918.
1,374,176.
Patented Apr. 12, 1921.
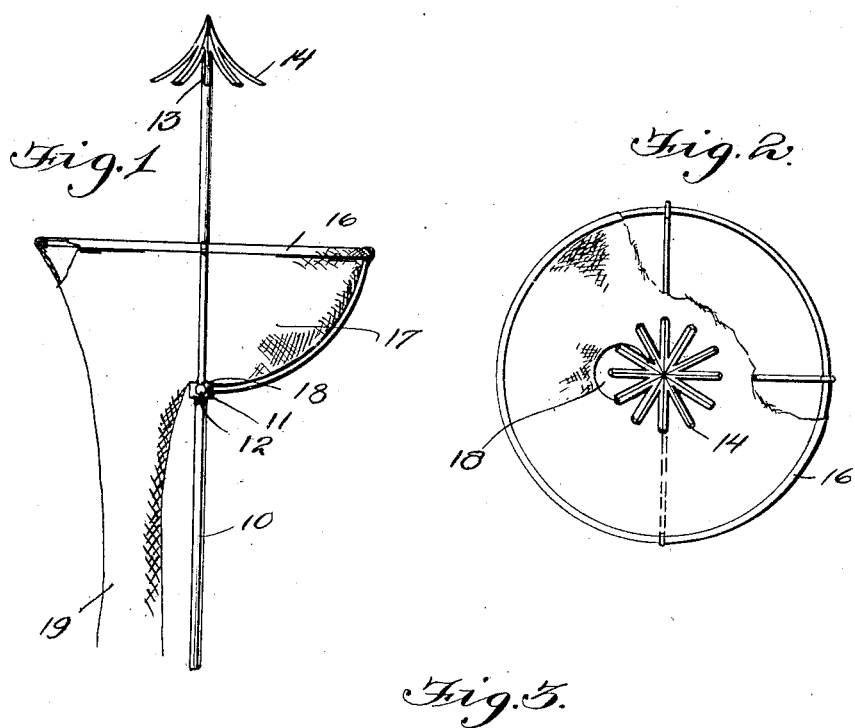
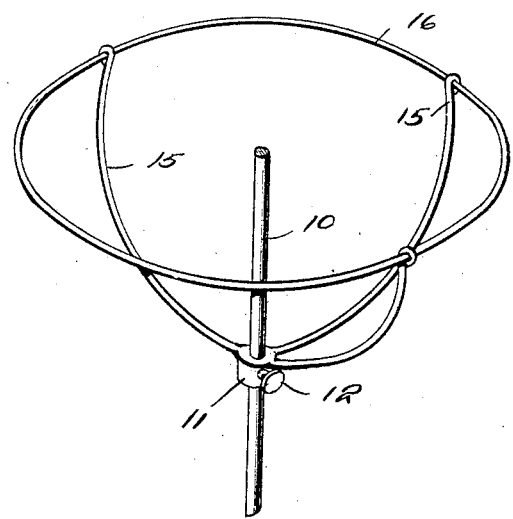

UNITED STATES PATENT OFFICE.

LIONEL M. BARNES, OF PAGET WEST, BERMUDA.

FRUIT-PICKER.

1,374,176.     Specification of Letters Patent.     Patented Apr. 12, 1921.

Application filed July 22, 1918. Serial No. 246,242.

*To all whom it may concern:*

Be it known that I, LIONEL M. BARNES, a citizen of Bermuda, residing at Paget West, Paget Island, Bermuda, have invented certain new and useful Improvements in Fruit-Pickers; and I do hereby declare the following to be a full, clear, and exact description of the invention, such as will enable others skilled in the art to which it appertains to make and use the same.

This invention relates to improvements in fruit pickers and particularly to devices for reaching up into the trees to sever the fruit and deliver the same through a fabric tube to a suitable receptacle below.

One object of the present invention is to provide a novel and improved means for securing the fabric tube and funnel on the pole or handle whereby the same is adjustable to suit the user and in accordance with the height of the fruit in the tree.

Another object of the present invention is to provide a novel and improved means for severing the fruit from the tree.

Other objects and advantages will be apparent from the following description when taken in connection with the accompanying drawing.

In the drawing:

Figure 1 is a side elevation of a fruit picking device made in accordance with my invention.

Fig. 2 is a top plan view partly broken away.

Fig. 3 is a perspective view of the supporting frame for the funnel of the device.

Referring particularly to the accompanying drawing, 10 represents a pole of suitable length on which is slidably disposed a ring or collar 11. A screw 12 is carried by the collar to permit the adjustment of the collar at different positions on the pole. Fixed on the upper end of the pole is a collar 13, and carried by this collar are the radially extending spokes or fingers 14. The fingers are curved in a downward direction as shown, and the edges are sharpened for the purpose of cutting the stem of the fruit which is brought between any pair of said fingers.

Carried by the collar 11 are the three upwardly and outwardly curved arms 15 to which are secured the horizontal ring 16. This ring is secured in the mouth of the funnel 17 which has the central opening 18 in the lower portion for the passage of the pole therethrough. Connected to the lower portion of the funnel, at one side of the opening 18, is a depending fabric tube 19 through which the fruit passes to a suitable receptacle, (not shown), disposed below the tree.

The curved arms 15 serve to hold the funnel in distended position, as shown.

In the operation of the device, the pole is pushed upwardly into the tree and the stem of a fruit engaged between any pair of fingers 14, the pole being so manipulated that the fingers are moved against the stem whereby the same is severed and the fruit caused to drop into the funnel and down the tube, where it is guided by the operator into the receptacle placed for that purpose. By means of the screw 12 the collar 11 can be adjusted to the height desired.

What is claimed is:

A fruit picker comprising a ring having a receptacle secured to and depending therefrom, a collar disposed centrally below the ring and having outwardly and upwardly directed arms terminating in eyes engaged with the ring, and a rod slidably disposed vertically through the collar and centrally through the ring and having fingers above the ring radiating from the upper end from all sides of the rod, and means for holding the rod at different points of its sliding movement through the collar to dispose the fingers at different distances from the ring, for the reception of fruits of different characters between them and the ring.

In testimony whereof, I affix my signature, in the presence of two witnesses.

LIONEL M. BARNES.

Witnesses:
S. W. TELLS,
E. C. COPE.